United States Patent [19]

Schornick et al.

[11] Patent Number: 4,778,847
[45] Date of Patent: Oct. 18, 1988

[54] PREPARATION OF CARBOXYLATES OF HYDROXYL-CONTAINING POLYMERS

[75] Inventors: Gunnar Schornick, Neuleiningen; Günther Schulz, Ludwigshafen; Walter Mann, Frankenthal, all of Fed. Rep. of Germany

[73] Assignee: BASF Aktiengesellschaft, Ludwigshafen, Fed. Rep. of Germany

[21] Appl. No.: 911,090

[22] Filed: Sep. 24, 1986

[30] Foreign Application Priority Data

Sep. 27, 1985 [DE] Fed. Rep. of Germany ....... 3534476

[51] Int. Cl.⁴ .......................... C08F 8/14; C08F 16/06; C08F 116/06
[52] U.S. Cl. ....................................... 525/59; 525/60; 525/61
[58] Field of Search ............................. 525/59, 60, 61

[56] References Cited

U.S. PATENT DOCUMENTS 3,560,465 2/1971 Reynolds .
4,517,277 5/1985 Lynch et al. .
4,540,743 9/1985 Schultz et al. .

FOREIGN PATENT DOCUMENTS 2632398 2/1978 Fed. Rep. of Germany .
3322993 6/1983 Fed. Rep. of Germany .

OTHER PUBLICATIONS

R. P. Kruger and R. Gnauck, Plaste und Kautschuk, vol. 28, p. 206, 1981.
Dee et al., "N-Methylimidazole as a Catalyst for Acetylation of Hydroxy Terminated Polymers", Analytic. Chem. (1980), p. 572.

Primary Examiner—Jacob Ziegler
Attorney, Agent, or Firm—Keil & Weinkauf

[57] ABSTRACT

Carboxylates of hydroxyl-containing polymers are prepared by reacting a finely dispersed hydroxyl-containing polymer with a carboxylic anhydride in the heterogeneous phase in the presence of a tertiary amine as a catalyst by a method in which an N-alkylimidazole, where alkyl is of 1 to 10 carbon atoms, is used as the catalyst.

10 Claims, No Drawings

PREPARATION OF CARBOXYLATES OF HYDROXYL-CONTAINING POLYMERS

The present invention relates to an improved process for the preparation of carboxylates of hydroxyl-containing polymers, in particular to an improved process for the preparation of alkenoates of partially or completely hydrolyzed polyvinyl alcohol alkyl esters and partially or completely hydrolyzed alkylene oxide/vinyl alcohol alkyl ester graft copolymers.

It has become common practice to refer to partially or completely hydrolyzed homopolymers and copolymers of vinyl alcohol alkyl esters and graft copolymers based on these polymers by the term polyvinyl alcohol. This term, although not completely correct, will be used below for the sake of brevity.

The process described at the outset, in which carboxylic anhydrides are reacted with polyvinyl alcohols in the presence of a tertiary amine, is disclosed in DE-A- No. 33 22 993, apart from the improvement according to the invention. The esterification catalysts used here were p-N,N-dialkylaminopyridines. R. P. Krüger and R. Gnauck, Plaste und Kautschuk, volume 28, page 206, 1981, furthermore disclose that N-methylimidazole can be used as a catalyst in the determination of the terminal hydroxyl groups of di- and trifunctional polyether alcohols by acetylation with a very large excess of acetic anhydride in homogeneous solution.

The conventional process has the disadvantage that fairly highly esterified products possess a strong coloration and are therefore not very suitable for their main field of use, the production of materials which can be crosslinked by photopolymerization.

It is an object of the present invention to improve the known esterification process and to overcome the associated disadvantage described above.

We have found that this object is achieved by a process for the preparation of carboxylates of hydroxyl-containing polymers by reacting a finely dispersed hydroxyl-containing polymer with a carboxylic anhydride in the heterogeneous phase in the presence of a tertiary amine as a catalyst, wherein an imidazole of the formula (I)

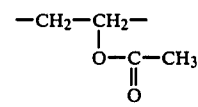

where R is alkyl of 1 to 10 carbon atoms, is used as a catalyst.

Examples of imidazoles used according to the invention are N-methyl-, N-ethyl-, N-n-propyl-, N-isopropyl-, N-n-butyl-, N-tert.-butyl-, N-2-butyl-, N-n-pentyl-, N-n-hexyl-, N-n-heptyl-, N-n-octyl-, N-isooctyl-, N-n-nonyl- and N-n-decylimidazole and mixtures of these. N-Methylimidazole is preferred. These catalysts are used in effective amounts, which are in general from 0.1 to 100, preferably from 1 to 50, in particular from 2 to 20, % by weight, based on the amount of carboxylic anhydride.

Suitable carboxylic anhydrides are those which are formed from alkane-, alkene- and/or arylcarboxylic acids of 2 to 12 carbon atoms, eg. acetic, propionic, valeric, succinic, acrylic, methacrylic, maleic, fumaric, crotonic, benzoic, phthalic or cinnamic anhydride. However, mixed anhydrides, such as acrylic methacrylic anhydride, are also suitable. Acrylic anhydride and methacrylic anhydride are preferred, the latter being particularly preferred. These carboxylic anhydrides are used in an amount of in general from 10 to 100, preferably from 12 to 90, in particular from 15 to 60, % by weight, based on the amount of polyvinyl alcohol.

Hydroxyl-containing polymers which can be esterified by the novel process are all polymers which are formed by polymerization of olefinically unsaturated monomers and contain free hydroxyl groups or into which such groups have been introduced subsequently by polymer-analogous reactions. Advantageous polymers are the polyvinyl alcohols which are soluble or dispersible in water, contain repeating 1-hydroxy-1,2-ethylidene units

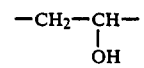

in the chain and have number average molecular weights $\overline{M}_n$ of from 15,000 to 100,000, in particular from 15,000 to 50,000, for example partially or completely hydrolyzed polyvinyl alcohol alkyl esters, in particular polyvinyl acetate and polyvinyl propionate, having a degree of hydrolysis of from 75 to 100, preferably from 80 to 95, mol %, or partially or completely hydrolyzed alkylene oxide/vinyl alcohol alkyl ester graft copolymers, in particular those which are obtained by grafting vinyl acetate or propionate onto polyethylene oxide and then carrying out hydrolysis and which consist of from 10 to 30% by weight of 1-oxa-1,3-propylidene, O—CH$_2$—CH$_2$—, from 0 to 30% by weight of 1-acetyl-1,2-ethylidene

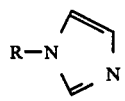

and from 90 to 40% by weight of 1-hydroxy-1,2-ethylidene units, the percentages in each case being based on the copolymer. Such polymers are well known. They can be used in the novel process individually or as a mixture of two or more polymers.

In terms of the method, the novel process does not have any special features, ie. the polyvinyl alcohol is dispersed in an aprotic liquid with the carboxylic anhydride and the imidazole I, and the reaction mixture is then heated at from 40° to 100° C. for a few hours (about 2-20 h). When the (partial) esterification is complete, the product which has been subjected to a polymer-analogous esterification reaction is filtered off, washed and dried in a conventional manner.

Examples of suitable aprotic liquids are lower halohydrocarbons, such as methylene chloride, chloroform, carbon tetrachloride or trichloroethane, lower aliphatic ketones, such as acetone, methyl ethyl ketone or methyl isobutyl ketone, aliphatic, cycloaliphatic or aromatic hydrocarbons, such as hexane, cyclohexane or gasoline fractions, and mixtures of two or more of these liquids.

The presence of a dispersant, for example an alkylsulfonate, such as sodium tetradecylsulfonate, is not generally necessary. In order to prevent thermal polymerization where alkenoic anhydrides are esterified, inhibitors, such as 2,6-di-tert-butyl-p-cresol, are advantageously used.

The carboxylates of hydroxyl-containing polymers prepared by the novel process, in particular the alkenoates of polyvinyl alcohols are substantially free of impurities and possess a less pronounced color than those prepared by the known process. This also applies to products having a high degree of esterification. These products are therefore very suitable for the production of materials which can be crosslinked by photopolymerization, such as printing plates and photoresist materials. These are produced in a conventional manner by adding the usual photoinitiators and, if required, photopolymerizable monomers, thermal polymerization inhibitors and other assistants and/or additives to the products obtained from the process according to the invention. The production of printing plates and photoresists from these materials which can be crosslinked by photopolymerization is carried out in a conventional manner by exposure to actinic light and washing out the unexposed parts with a developer.

In the Examples below, the degree of discoloration of the reaction products was determined by measuring the extinction of their 10% strength solutions in 2:1 (v/v) water/n-propanol at a wavelength $\lambda$ of 335 nm; an extinction of less than 0.5 cm$^{-1}$ is advantageous. The presence or absence of by-products was determined from the infrared spectra of the products. In the case of esterification with alkenoic acids, the occurrence or absence of a shoulder (wave number $\nu = 1645$ cm$^{-1}$) on the absorption band of the carbon-carbon double bond (wave number $\nu = 1625$ cm$^{-1}$) is an indication of the presence or absence, respectively, of by-products.

EXAMPLE 1

1000 kg of a partially hydrolyzed polyvinyl acetate having a degree of hydrolysis of 82 mol % were dispersed in a mixture of 1800 kg of toluene, 165 kg of methacrylic anhydride (containing 3.5% of methacrylic acid as an impurity), 10 kg of 2,6-di-tert-butyl-p-cresol and 5 kg of N-methylimidazole, the dispersion was stirred for 8 hours at 90° C. and the resulting reaction product was filtered off, washed with toluene and acetone and dried. It contained 5.5% by weight of methacrylate groups and was free of by-products and virtually colorless (extinction: 0.325 cm$^{-1}$).

EXAMPLE 2

The procedure described in Example 1 was followed, except that 10 kg of N-methylimidazole was used instead of 5 kg. The resulting reaction product contained 6.2% by weight of methacrylate groups and was free from by-products and virtually colorless (extinction: 0.285 cm$^{-1}$).

EXAMPLE 3

The procedure described in Example 1 was followed, except that, instead of the partially hydrolyzed polyvinyl acetate, a partially hydrolyzed ethylene oxide/vinyl acetate graft copolymer having a number average molecular weight $\overline{M}_n$ of 20,000 and consisting of 25% by weight of 1-oxa-1,3-propylidene, 25% by weight of 1-acetyl-1,2-ethylidene and 50% by weight of 1-hydroxy-1,2-ethylidene units, the percentages being based on the graft copolymer, was used. The resulting reaction product contained 6.1% by weight of methacrylate groups and was free of by-products.

EXAMPLE 4

The procedure described in Example 3 was followed, except that 10 kg of N-methylimidazole was used instead of 5 kg. The resulting reaction product contained 6.5% by weight of methacrylate groups and was free of by-products.

EXAMPLE 5

The procedure followed was similar to that described in Example 3, except that 1000 g of a partially hydrolyzed ethylene oxide/vinyl acetate graft copolymer having a number average molecular weight $\overline{M}_n$ of 18,000 and consisting of 25% by weight of 1-oxa-1,3-propylidene, 2% by weight of 1-acetyl-1,2-ethylidene and 73% by weight of 1-hydroxy-1,2-ethylidene units, the percentages being based on the copolymer, 540 g of methacrylic anhydride, 30 g of N-methylimidazole and 20 g of 2,6-di-tert-butyl-p-cresol were used. The resulting reaction product contained 14% by weight of methacrylate groups and was free of by-products.

EXAMPLE 6

The procedure described in Example 5 was followed, except that the graft copolymer according to Example 3 was used. The resulting reaction product contained 20.4% by weight of methacrylate groups and was free of by-products.

We claim:

1. A process for the preparation of a carboxylate of a water soluble or water dispersible polyvinyl alcohol, the said process comprising the following steps:
   (i) preparing a heterogeneous phase by finely dispersing a water soluble or water dispersible polyvinyl alcohol in an aprotic liquid containing a carboxylic anhydride and, as a catalyst, an imidazole of the formula I

where R is alkyl of 1 to 10 carbon atoms,
   (ii) heating the thus prepared heterogeneous phase to a temperature from 40° to 100° C., thereby esterifying or partially esterifying the hydroxyl groups of the said polyvinyl alcohol in the heterogeneous phase with the carboxylic anhydride, and
   (iii) filtering off the thus prepared esterified or the partially esterified polyvinyl alcohol.

2. The process of claim 1, wherein the polyvinyl alcohol is a partially or completely hydrolyzed polyvinyl alcohol alkyl ester having a number average molecular weight $\overline{M}_n$ from 15,000 to 100,000 and a degree of hydrolysis from 75 to 100 mol%.

3. The process of claim 1, wherein the polyvinyl alcohol is a partially or completely hydrolyzed alkylene oxide/vinyl alcohol alkyl ester graft copolymer.

4. The process of claim 3, wherein the partially or completely hydrolyzed alkylene oxide/vinyl alcohol alkyl ester graft copolymer consists of from 10 to 30% by weight of 1-oxa-1,3-propylidene units, from 0 to 30% by weight of 1-acetyl-1,2-ethylidene units and of from 90 to 40% by weight of 1-hydroxy-1,2-ethylidene units, the percentages being based on the graft copolymer.

5. The process of claim 1, wherein the aprotic liquid is selected from the group consisting of lower halohydrocarbons, lower aliphatic ketones, aliphatic hydrocarbons, cycloaliphatic hydrocarbons and aromatic hydrocarbons.

6. The process of claim 1, wherein the carboxylic anhydride is selected from the group consisting of alkane-, alkene- and arylcarboxylic acid anhydride of 2 to 12 carbon atoms.

7. The process of claim 6, wherein the carboxylic anhydride is selected from the group consisting of acetic, propionic, valeric, succinic, acrylic, methacrylic, maleic, fumaric, crotonic, benzoic, phthalic, cinnamic and mixture of acrylic and methacrylic carboxylic anhydride.

8. The process of claim 7, wherein the carboxylic anhydride is methacrylic anhydride.

9. The process of claim 1, wherein the imidazole I is selected from the group consisting of N-methyl-, N-ethyl-, N-n-propyl-, N-isopropyl-, N-n-butyl-, N-tert.-butyl-, N-2-butyl-, N-n-pentyl-, N-n-hexyl-, N-n-heptyl-, N-n-octyl-, N-isooctyl-, N-n-nonyl- and N-n-decylimidazole.

10. The process of claim 7, wherein the aprotic liquid contains an inhibitor.

* * * * *